Oct. 6, 1959             A. J. HUCK             2,907,862
COMBINATION GRIDDLE AND FRYER
Filed May 28, 1956             2 Sheets-Sheet 2
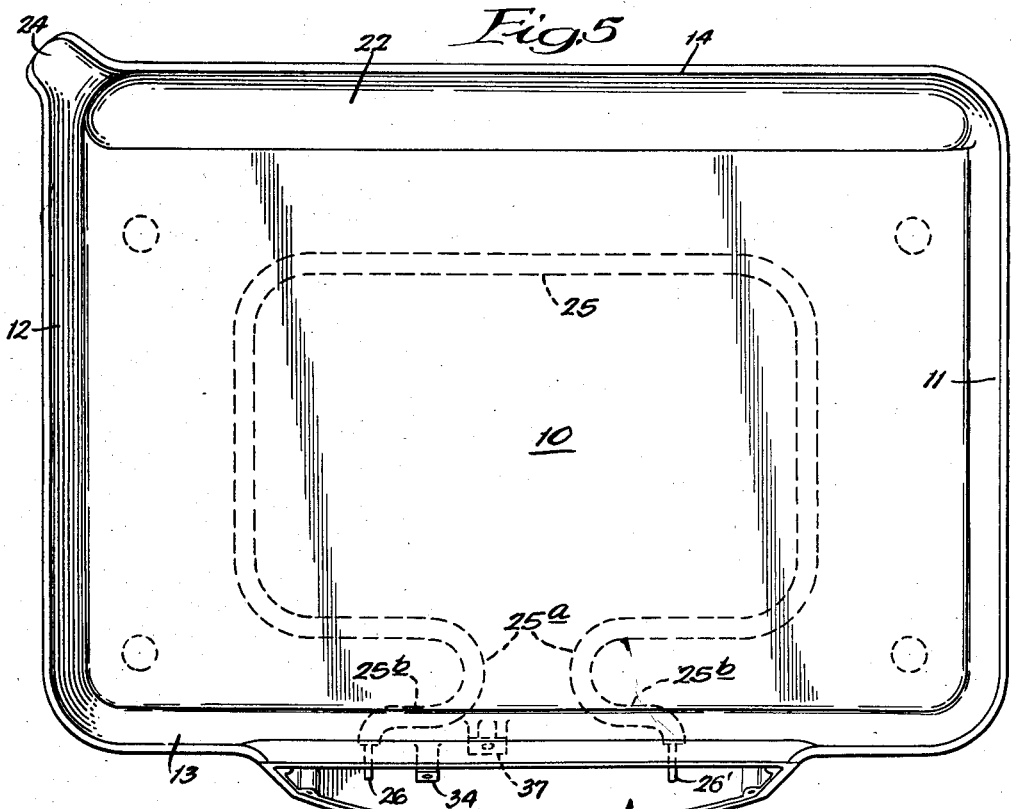
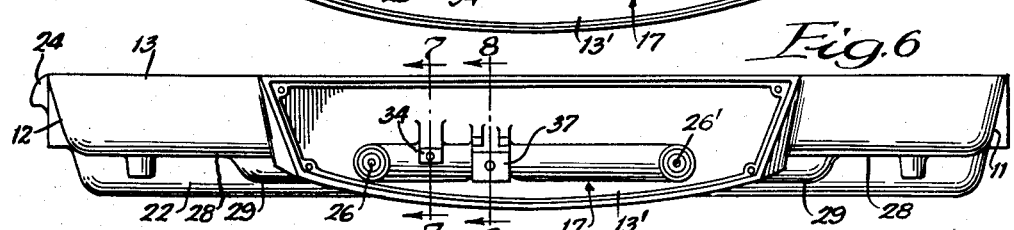
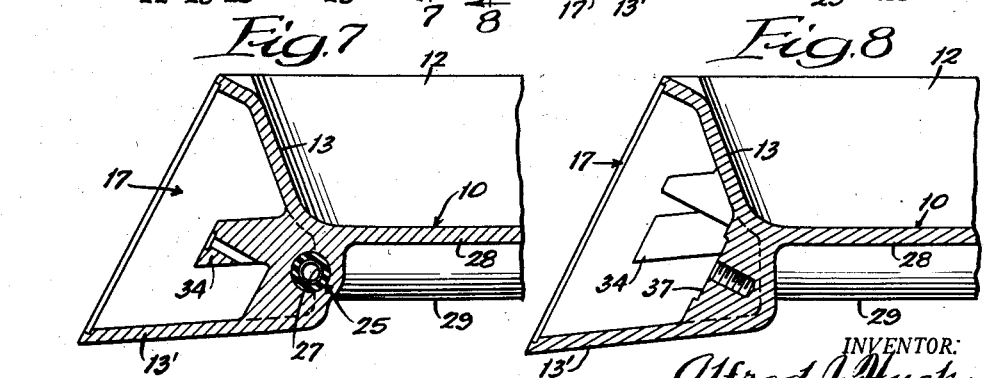
INVENTOR:
Alfred J. Huck,
BY
Bair, Freeman & Molinare
ATTORNEYS.

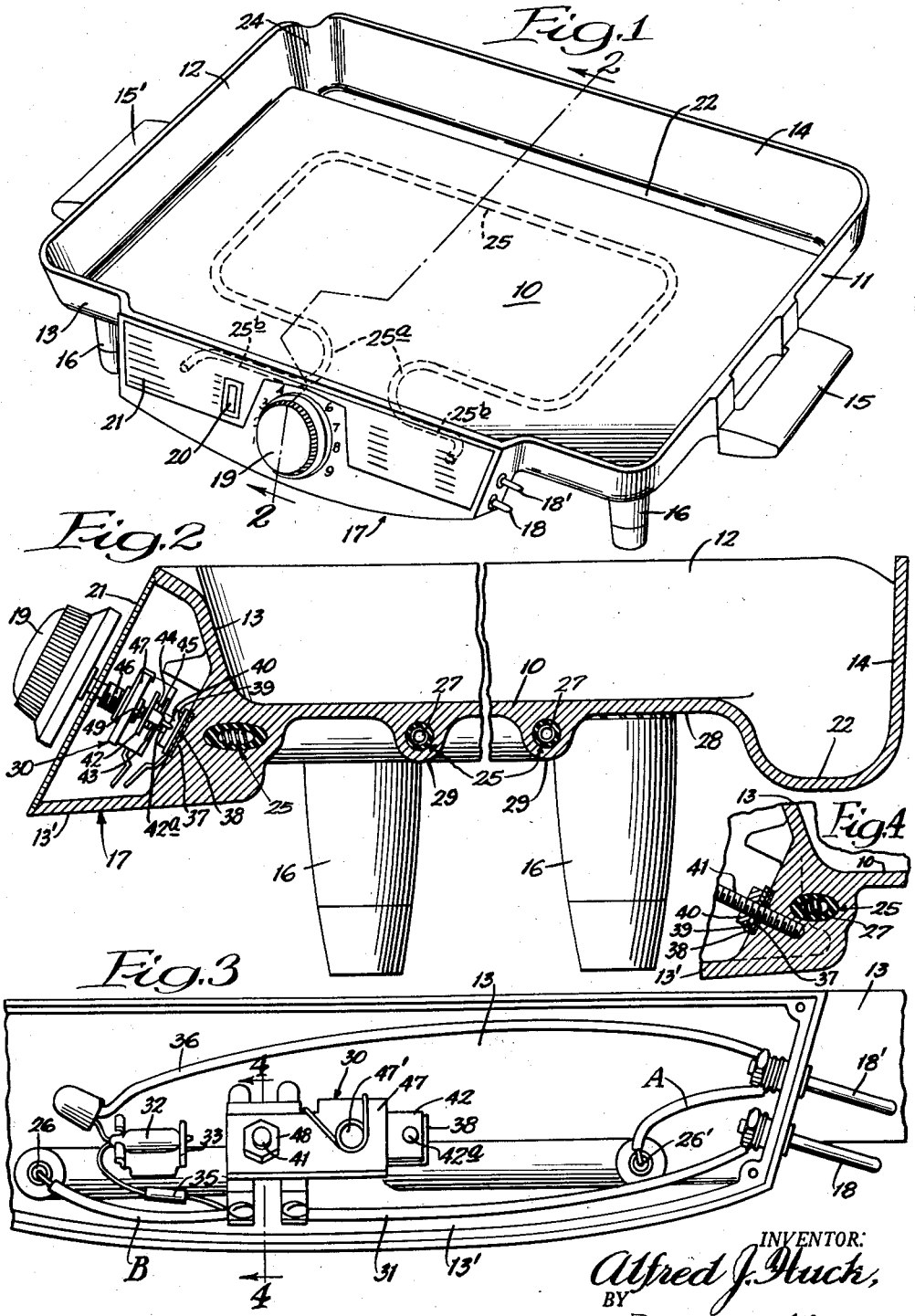

United States Patent Office 2,907,862
Patented Oct. 6, 1959

2,907,862

COMBINATION GRIDDLE AND FRYER

Alfred J. Huck, St. Louis, Mo., assignor to Knapp-Monarch Company, St. Louis, Mo., a corporation of Delaware Application May 28, 1956, Serial No. 587,656

6 Claims. (Cl. 219—44)

This invention relates generally to an electrical cooking appliance and more particularly to an electrical appliance adapted for both frying and grilling operations.

It is known in the prior art to provide electrical cooking appliances of the type identified generally as "deep fat fryers." Such appliances conventionally comprise a relatively deep receptacle adapted to receive cooking oil, wherein the oil is heated by a heating element disposed in heat conductive relation to the receptacle. Appliances of this type have proved well adapted to the successful deep-fat frying of foods such as chicken, potatoes, shrimp and the like.

However, because of health and diet restrictions, there are a large number of persons who prefer, or who are restricted to, eating foods which have been fried in a bare minimum of grease. Thus, there exists a strong demand for electrical cooking appliances adapted for "grilling," or so-called "greaseless" frying operations. Heretofore, there has been no practical or marketable appliance wherein either the "deep fat" or "grilling" operations could be carried out, as desired.

It is a general object of this invention to provide an improved electrical cooking appliance capable of providing either deep fat frying or grilling functions, as desired.

It is another object of this invention to provide an improved electrical cooking appliance for deep fat frying having a large and substantially flat frying surface bounded by a plurality of upright walls for holding cooking fat therewithin, and having a relatively deep well at one side thereof into which oil may be placed so as to fill the well and overflow over the frying surface sufficiently to enable deep fat frying of desired articles of food.

It is still another object of this invention to provide an improved electrical cooking appliance for grilling or so-called "greaseless" frying having a large and substantially flat and slightly pitched frying surface with a relatively deep well adjacent the lower edge of the frying surface which serves to maintain the frying surface desirably dry by draining, catching, and removing greases which arise during the grilling operation.

It is a further object of this invention to provide such an improved electrical cooking appliance wherein the well at one side of the frying surface has a pouring spout provided therein for enabling oils and greases to be easily and readily removed from the appliance.

It is a still further object of this invention to provide such an improved electrical cooking appliance wherein the large and substantially flat frying surface, the relatively deep fat well associated therewith, and a housing for the electrical and thermal control apparatus therefor all are embodied in a single and integrally formed casting.

It is a still further object of this invention to provide such an improved electrical cooking appliance having a heating element substantially centrally and uniformly embedded within the bottom of the frying surface, and a thermostat control assembly operatively associated with the heating element for providing sensitive heating control effectively responsive to the true cooking temperature being attained centrally of the frying surface.

With these and other objects in view, the invention consists in the construction, arrangement and combination of the various parts of the combination griddle and fryer herein described. The features of novelty which characterize the invention are pointed out with particularity in the claims annexed to and forming part of the specification. For a better understanding of the invention, however, its advantages and the specific objects attained by its use, reference is had to the accompanying drawing and descriptive matter in which is shown and described an illustrative embodiment of the invention.

In the drawings:

Figure 1 is a perspective view of an embodiment of a combination griddle and fryer in accordance with this invention;

Figure 2 is an enlarged cross-section view taken on line 2—2 of Figure 1, and with portions broken away to reduce the overall width of the figure;

Figure 3 is a front elevation view of the uncovered control chamber having therein the electrical and thermal control apparatus;

Figure 4 is an enlarged fragmentary cross-section view taken on line 4—4 of Figure 3;

Figure 5 is a top plan view of the single casting which defines the major portion of the cooking appliance made in accordance with the invention;

Figure 6 is a front elevational view of the casting shown in Figure 5, and showing the interior of the control chamber; and Figures 7 and 8 are enlarged fragmentary cross-section views taken respectively on lines 7—7 and 8—8 of Figure 6.

Turning now to the drawings, there is shown a cooking appliance having a substantially flat cooking surface 10, of generally rectangular configuration. The cooking appliance includes a pair of relatively short upright end walls 11 and 12, and relatively long, upright front and rear walls, 13 and 14, respectively, said upright walls laterally bounding the space above said cooking surface 10. Secured to the end walls 11 and 12 are heat insulating handles 15 and 15' which may be constructed of a phenolic resin, or the like, and which provide convenient means for handling the cooking appliance.

The cooking appliance is supported on four heat insulating support legs 16 which also may be constructed of a phenolic resin, or the like. The legs 16 may be attached in any convenient manner such as by being screwed onto threaded studs which extend downwardly from the body of the cooking appliance.

In the front wall 13 of the device there is defined a control housing enlargement generally indicated at 17. Extending laterally from said control housing 17 are a pair of prongs 18 and 18' adapted for connection to an electric service cord.

A dial 19 is rotatably mounted on the front of housing 17 in a manner described in greater detail below, for enabling the operating temperature of the device to be selectively adjusted as desired by the user. An indicator lens 20 is provided adjacent dial 19 for enabling a visual indication of the operating condition of the device. Advantageously, an escutcheon, or name plate, 21 is secured to the front of housing 17 and has imprinted thereon a tabulation of dial settings corresponding to suggested operating temperatures for various foods adapted to be cooked in the device.

In accordance with the invention, the combination griddle and fryer primarily comprises a single and integrally formed casting. Between the rear wall 14 and the rearmost edge of the flat frying surface 10 of the device, the casting defines an elongated, relatively deep, scavenger well 22 which extends adjacent the entire length of wall 14. The scavenger well 22 and the upright walls 11, 12, 13 and 14 cooperate to define a deep fat receiving space when the appliance is used for deep fat frying. The scavenger well 22 serves to capture food particles which break off during the cooking operation, and a slightly rearwardly pitched surface 10 helps to deliver such food particles to scavenger well 22, thus keeping the surface 10 substantially free from such undesirable food particles.

When it is desired to fry foods immersed in fat or oil, well 22 is filled and caused to overflow such that the oil level in the device is substantially near the upper edges of the upright walls during the deep-fat frying operation. The walls 11, 12, 13 and 14 are sufficiently deep so that in this manner most foods including chicken, shrimp, potatoes, etc., can be completely immersed in the oil for efficient and successful deep fat frying. When the deep fat cooking operation is completed, the oil therewithin may be easily and readily removed from the device due to the provision of a pouring spout 24 disposed at one end of scavenger well 22, and integrally formed at the junction of upright walls 12 and 14.

Additionally, the invention is adapted for so-called greaseless frying or grilling. It will be appreciated that even in this type of frying, due to the inherent nature of many foods, a certain amount of grease or oil will arise during the grilling operation. In order to minimize the accumulation of grease on surface 10 as much as possible, scavenger well 22 is adapted to catch and remove these greases and thereby maintains the frying surface 10 as free from fat as possible. Frying surface 10 is preferably constructed with a slight downward pitch towards the scavenger well 22 to facilitate the flow of grease thereto. In the grilling operation the fat, if any, in scavenger well 22 should not overflow onto surface 10, so that well 22 will properly serve its scavenging function of receiving fat from surface 10. In this manner an efficient yet relatively simple cooking appliance has been provided which combines the normally opposed requirements presented by both deep fat frying and grilling.

The main body of the cooking appliance including cooking surface 10, upright walls 11, 12, 13 and 14, scavenger well 22 and pouring spout 24 are preferably formed in a single casting. The casting is also provided with a forwardly projecting wall, or shelf member 13' which cooperates with upright wall 13 and escutcheon 21 to define a laterally opening control housing 17 heretofore referred to. The arrangement of walls 13, 13', and escutcheon 21 is such as to provide an interior in said housing 17 of substantially triangular cross-section as best seen in Figures 7 and 8. The upright wall 13 which serves as the front wall of the appliance also serves as the rear wall of housing 17.

Difficulties have been encountered in electrical appliances heretofore, in the problem of properly positioning thermal control apparatus therefor with respect to the heating element so as to achieve little or no lag in the transmission of heat from the heating element to the thermal control. Thus, in many prior art types of cooking appliances a lag has existed between the heat present at the cooking surface and the heat being sensed in the thermal control apparatus, and this lag in sensing the correct temperature has frequently resulted in improper cooking.

In accordance with a further feature of this invention, a heating element 25 of generally rectangular configuration is embedded within the bottom of the device. Heating element 25, which advantageously may be a narrow, elongated tubular member including a high resistance wire 27 therewithin, is precast into the lower surface of the base 28 of the device, and the presence of heating element 25 creates the boss 29 shown. The upper surface of base 28 is the cooking surface 10. The heating element generally is uniformly and centrally disposed throughout most of base 28, said heating element being arranged and disposed inwardly relative to the periphery of the base 28 and outwardly relative to the center of the base, so as to provide sufficient heating for the entire base so as to bring about a proper cooking operation.

The end sections of the heating element 25 are extended and shaped peculiarly as best shown in Figure 5, and includes reverse bent U-shaped portions 25a which are arranged so that the outermost arms 25b of U-shaped portions 25a lie immediately adjacent the front edge of the base 28 to provide a heated region immediately adjacent the front edge of base 28, which is heated substantially to the same temperature as the cooking surface 10 of the base which is located immediately adjacent and above the heating element 25.

The portions 25b of the heater 25 which run along the front edge of the base 28 lie in parallel and abutting relation to the rear wall 13 of the control housing 17. Terminals 26 and 26' of the heating element are brought out into the interior of housing 17 for connection to the control apparatus and the cord prongs.

As shown in Figure 3, terminal 26' is connected to prong 18' by wire A, and terminal 26 is connected through a wire B, a control assembly 30, and a wire 31 to prong 18. An indicator lamp 32 is supported by a clamp member 33 on boss 34, cast integrally with rear wall 13 of housing 17. Lamp 32 is connected in series with a current limiting resistor 35, and both are connected in series between control assembly 30 and prong 18' by a wire 36.

The control assembly 30 includes both a thermal control and an electrical control, and said control assembly is supported within housing 17 by a single threaded stud member rigidly positioned in a boss 37 which is cast integral in the rear wall 13 of housing 17. The thermal control comprises a bimetal member 38 tightly secured against boss 37 in heat sensing relation therewith by a washer 39 and a lock nut 40 carried on stud member 41. It is a feature of this invention that excellent heat transfer is provided between the thermal control and the region heated by heater 25, with a minimum of time lag between the heating element and the bimetal member, by maintaining the bimetal member 38 in close fitting relation with boss 37, such as by a shaped recess and by locating the boss 37 in closely adjacent relation to a portion 25b of the heating element 25, so as to provide an excellent heat sensing association between bimetal 38 and said heating element portion 25b.

The purpose of good heat sensing relation between the thermal control and heater 25 is so that the thermal control will be correctly responsive substantially to the temperature being attained on the cooking base 10 adjacent the heating element 25 therefor.

The boss 37 may be best seen in the fragmentary cross-section views of Figures 2, 4, 6 and 8 and in the plan view of Figure 5. Thus the bimetal member 38 is adapted to quickly sense the actual temperature of the heating element 25 and thereby provide a control which is directly responsive to the cooking temperature actually existing centrally on the frying surface 10 immediately adjacent the major portion of the heating element 25.

The electrical switch that is controlled by bimetal member 38 includes a pair of resilient switch blades 42 and 43 that are mounted on stud member 41 and are appropriately insulated from each other. The switch blades 42 and 43 carry contacts 44 and 45 respectively. The switch blades are arranged so that contacts 44 and 45 are normally biased in engagement with each other and said engagement between contacts 44 and 45 continues under the upward bias of blade 43 over a range of movement of blade 42, which is adapted to be moved upward by bimetal 38 as is hereinafter described.

The electrical switch contacts 44 and 45, of the electric control of control assembly 30, are maintained in normally closed relation directly above bimetal member 38. A switch blade 42 which carries contact 44 has at one end thereof a downwardly depending insulator member 42a adapted to be engaged by bimetal member 38 when the latter responds to the temperature being sensed and warps upwardly so as to open contacts 44 and 45 and thereby deenergize heating element 25. Selective temperature control is provided by dial 19 which has a threaded control shaft 46 connected thereto adapted to be moved inwardly and outwardly of a supporting member.

Control shaft 46 is carried by a plate-like support member 47 that is carried on stud 41 and is appropriately insulated from the bimetal 38 and switch blades 42 and 43 that are also carried on said stud. The entire assembly of bimetal 38, blades 42 and 43, and support 47 for control shaft 46, is clamped together by means of nut 48 threaded onto stud 41.

Control shaft 46, which is threaded through threaded bore 47' in support 47, has an insulated tip 49 which is adapted to extend through an aperture (not shown) in blade 42 to engage blade 43 to limit upward movement of blade 43 and to provide the variable points at which the contacts 44 and 45 separate, as blade 42 is urged upwardly by bimetal 30. Rotation of control dial 19 thus varies the temperature at which the contacts 44 and 45 separate.

Connected in series with the electrical contacts of the switching assembly is the indicator lamp 32 and a current limiting resistor 35. Thus, when the heating element is energized, lamp 32 is lighted and this condition is indicated to the user through the indicator lens 20.

It will be understood by those skilled in the art that changes may be made in the construction and arrangement of the parts of the novel combination fryer and griddle without departing from the real spirit and purpose of the invention, and it is intended that the claims cover any modified forms of structure or use of equivalents which may be reasonably included within their scope.

What I claim as new, and desire to secure by Letters Patent of the United States, is:

1. An electric cooking appliance comprising, in combination, a base having a substantially flat cooking surface, said base having opposed front and rear edges and being arranged to have a slight downward pitch toward the rear edge thereof, upright walls connected to said base and defining a cooking receptacle for deep fat frying or grilling operations therewithin on the same cooking surface, means defining an elongated scavenging well adjacent only the rear edge of the base, means defining an elongated control housing disposed longitudinally adjacent the front edge of said base, and electrical and thermal control apparatus for controlling the operation of said cooking appliance disposed in said control housing.

2. An electric cooking appliance comprising, in combination, a base having a substantially flat cooking surface, said base having opposed front and rear edges and being arranged to have a slight downward pitch toward the rear edge thereof, upright walls connected to said base and defining a cooking receptacle for deep fat frying or grilling operations therewithin on the same cooking surface, means defining an elongated scavenging well adjacent only the rear edge of the base, a narrow elongated heating element in heating relation with said base, said heating element being arranged and disposed so as to be spaced inwardly relative to the upright walls and spaced inwardly relative to said scavenging wall and located outwardly relative to the center of the base so as to provide heating for the entire base to bring about a proper cooking operation, means defining an elongated control housing disposed longitudinally adjacent the front edge of said base, and electrical and thermal control apparatus for controlling the operation of said cooking appliance disposed in said control housing.

3. An electric cooking appliance comprising, in combination, a base having a substantially flat cooking surface, said base having opposed front and rear edges and being arranged to have a slight downward pitch toward the rear edge thereof, upright walls connected to said base and defining a cooking receptacle for deep fat frying or grilling operations therewithin on the same cooking surface, means defining an elongated scavenging well adjacent only the rear edge of the base, a narrow elongated heating element in heating relation with said base, said heating element being arranged and disposed so as to be spaced inwardly relative to the upright walls and spaced inwardly relative to said scavenging wall and located outwardly relative to the center of the base so as to provide heating for the entire base to bring about a proper cooking operation, said heating element having a segment thereof extended outwardly to adjacent the front edge of said base, and a portion of said segment of said heating element being disposed to run longitudinally adjacent the front edge of said base to provide a heated region adjacent the front edge of the base which is heated substantially to the same temperature as the cooking surface of the base directly adjacent the heating element thereon, and control means for said cooking appliance including a thermal control in heat sensing association with said heated region adjacent the front edge of the base.

4. An electric cooking appliance comprising, in combination, a base having a substantially flat cooking surface, said base having opposed front and rear edges and being arranged to have a slight downward pitch toward the rear edge thereof, upright walls connected to said base and defining a cooking receptacle for deep fat frying or grilling operations therewithin on the same cooking surface, means defining an elongated scavenging well adjacent only the rear edge of the base, a narrow elongated heating element in heating relation with said base, said heating element being arranged and disposed so as to be spaced inwardly relative to the upright walls and spaced inwardly relative to said scavenging wall and located outwardly relative to the center of the base so as to provide heating for the entire base to bring about a proper cooking operation, said heating element having a segment thereof extended outwardly to adjacent the front edge of said base, and a portion of said segment of said heating element being disposed to run longitudinally adjacent the front edge of said base to provide a heated region adjacent the front edge of the base which is heated substantially to the same temperature as the cooking surface of the base directly adjacent the heating element thereon, and control means for said cooking appliance including a thermal control in heat sensing association with said heated region adjacent the front edge of the base, and means providing for excellent heat transmission between said thermal control and said heated region so that said thermal control is correctly responsive substantially to the temperature being attained on the cooking surface immediately adjacent the heating element therefor.

5. An electric cooking appliance comprising, in combination, a base having a substantially flat cooking surface, upright peripheral walls carried on said base and surrounding said cooking surface and cooperating therewith to define a cooking receptacle, a narrow elongated heating element in heating relation with said base and disposed in a plane substantially parallel to said cooking surface, said heating element being arranged and disposed so as to be spaced inwardly relative to the upright peripheral walls on the base and spaced outwardly relative to the center of the base so as to provide heating for the entire cooking surfaces to bring about a proper cooking operation, said heating element having a segment thereof extended outwardly to adjacent one edge of said base, and a portion of said segment of said heating element being disposed to run longitudinally adjacent said one edge of said base to provide a heated region adjacent said one edge of the base which is heated substantially to the same temperature as the cooking surface of the base directly adjacent the heating element thereon, and control means for said cooking appliance including a thermal control in heat sensing association with said heated region adjacent said one edge of the base.

6. An electric cooking appliance comprising, in combination, a base having a substantially flat cooking surface, upright peripheral walls carried on said base and surrounded said cooking surface and cooperating therewith to define a cooking receptacle, a narrow elongated heating element in heating relation with said base and disposed in a plane substantially parallel to said cooking surface, said heating element being arranged and disposed so as to be spaced inwardly relative to the upright peripheral walls on the base and spaced outwardly relative to the center of the base so as to provide heating for the entire cooking surface to bring about a proper cooking operation, said heating element having a segment thereof extended outwardly to adjacent one edge of said base, and a portion of said segment of said heating element being disposed to run longitudinally adjacent said one edge of said base to provide a heated region adjacent said one edge of the base which is heated substantially to the same temperature as the cooking surface of the base directly adjacent the heating element thereon, control means for said cooking appliance including a thermal control in heat sensing association with said heated region adjacent said one edge of the base, and means providing for excellent heat transmission between said thermal control and said heated region adjacent said one edge of the base, so that said thermal control is correctly responsive substantially to the temperature being attained on the cooking base immediately adjacent the heating element therefor, and means defining a control housing disposed immediately adjacent said one edge of said base for housing therein the control means for said cooking appliance.

References Cited in the file of this patent

UNITED STATES PATENTS

| | | |
|---|---|---|
| D. 178,264 | Rossall | July 10, 1956 |
| 1,936,551 | Garrison | Nov. 21, 1933 |
| 1,974,796 | Davis | Sept. 25, 1934 |
| 1,994,909 | Ehrgott | Mar. 19, 1935 |
| 2,262,302 | Sinclair | Nov. 11, 1941 |
| 2,524,954 | Best | Oct. 10, 1950 |
| 2,611,070 | Chandler | Sept. 16, 1952 |
| 2,704,320 | Crawford | Mar. 17, 1955 |
| 2,744,995 | Jepson | May 8, 1956 |
| 2,753,436 | Schwaneke | July 3, 1956 |
| 2,839,662 | Theisen | June 17, 1958 |
| 2,840,684 | Watkins | June 24, 1958 |